(12) United States Patent
Kuhnle

(10) Patent No.: US 8,757,694 B1
(45) Date of Patent: Jun. 24, 2014

(54) COLLAPSIBLE TAILGATE EXTENSION

(71) Applicant: Kevin Arlyn Kuhnle, Marengo, IA (US)

(72) Inventor: Kevin Arlyn Kuhnle, Marengo, IA (US)

( * ) Notice: Subject to any disclaimer, the term of this patent is extended or adjusted under 35 U.S.C. 154(b) by 0 days.

(21) Appl. No.: 13/752,537

(22) Filed: Jan. 29, 2013

Related U.S. Application Data

(60) Provisional application No. 61/611,468, filed on Mar. 15, 2012.

(51) Int. Cl.
*B62D 33/03* (2006.01)

(52) U.S. Cl.
USPC .................... 296/26.08; 296/26.11; 296/57.1; 296/37.6

(58) Field of Classification Search
USPC .................... 296/26.08–26.11, 57.1, 61, 37.6
See application file for complete search history.

(56) References Cited

U.S. PATENT DOCUMENTS

| | | | | |
|---|---|---|---|---|
| 4,531,773 A * | 7/1985 | Smith | ........................ | 296/26.11 |
| 4,778,213 A * | 10/1988 | Palmer | ....................... | 296/26.11 |
| 5,501,500 A | 3/1996 | Cannon | | |
| 5,816,637 A * | 10/1998 | Adams et al. | .............. | 296/26.09 |
| 5,924,753 A * | 7/1999 | DiBassie | ..................... | 296/26.09 |
| 6,120,076 A * | 9/2000 | Adsit et al. | .................. | 296/26.11 |
| 6,179,360 B1 * | 1/2001 | Davian | ............................ | 296/50 |
| 6,193,294 B1 * | 2/2001 | Disner et al. | ............... | 296/26.11 |
| 6,227,593 B1 * | 5/2001 | De Valcourt | ............... | 296/26.08 |
| 6,367,858 B1 | 4/2002 | Bradford | | |
| 6,431,630 B1 | 8/2002 | Meinke | | |
| 6,513,688 B2 * | 2/2003 | Kmita et al. | .................. | 224/403 |
| 6,550,836 B2 * | 4/2003 | Rigau | .......................... | 296/37.6 |
| 6,626,478 B1 * | 9/2003 | Minton | ...................... | 296/26.11 |
| 6,746,066 B2 * | 6/2004 | Reed | .......................... | 296/26.08 |
| 6,883,849 B2 | 4/2005 | Hebert | | |
| 6,994,389 B1 * | 2/2006 | Graffy et al. | ............... | 296/26.11 |
| 7,021,689 B1 * | 4/2006 | Weisbeck, III | ............. | 296/26.11 |
| 7,063,366 B2 * | 6/2006 | Leitner et al. | .............. | 296/26.11 |
| 7,175,218 B1 * | 2/2007 | Keene | ........................ | 296/26.08 |
| 7,347,474 B2 | 3/2008 | Shagbazyan | | |
| 7,488,021 B1 * | 2/2009 | Roos et al. | .................. | 296/26.11 |
| 7,699,373 B2 * | 4/2010 | Miller | ........................ | 296/26.09 |
| 7,703,825 B2 | 4/2010 | Brown | | |
| 8,109,552 B2 * | 2/2012 | Nelson | ....................... | 296/26.11 |
| 8,182,012 B1 * | 5/2012 | Brister | ....................... | 296/26.11 |
| 2009/0309381 A1 * | 12/2009 | Nelson | ....................... | 296/26.11 |
| 2010/0026027 A1 * | 2/2010 | Gao | ........................... | 296/26.11 |

FOREIGN PATENT DOCUMENTS

WO  2012003574  1/2012

* cited by examiner

*Primary Examiner* — Glenn Dayoan
*Assistant Examiner* — Gregory Blankenship
(74) *Attorney, Agent, or Firm* — Jason R. Sytsma; Shuttleworth & Ingersoll, PLC

(57) ABSTRACT

A truck bed extension includes two portions of a base pivotally attached to each other and a side wall pivotally attached to one of each base portion. An attachment combines the base portions to truck bed and a tailgate attachment pivotally combines the tail gate to the base portions. I this manner, a removable truck bed extension is provided that can be collapsed and stored in the truck bed for selective use.

19 Claims, 20 Drawing Sheets

COLLAPSIBLE TAILGATE EXTENSION

CROSS-REFERENCE TO RELATED APPLICATIONS

The present application claims priority to provisional patent application 61/611,468 which was filed on Mar. 15, 2012, and is hereby expressly incorporated by reference.

FIELD OF THE INVENTION

The present invention relates generally to an apparatus for a tailgate extension. In particular, the present invention is an apparatus for a detachable tailgate extension that is collapsible.

BACKGROUND

Most trucks are available to be manufactured in such a way that the length of the vehicle bed is variable. Sometimes, a truck owner wishes to have a vehicle bed that is longer than the standard size. The problem arises when the embodiment of the truck is larger than the space requirements of a garage, parking space, or any similar vehicle housings. It is therefore an object of the present invention to increase the length of a vehicle bed in such a way that an extension to the tailgate of the vehicle can be removed. Also, it is an object of the present invention to have such an extension that is collapsible to simplify storage and assembly to the vehicle bed.

SUMMARY

A truck bed extension for extending a bed of a truck is provided. The truck bed extension includes two portions of a base pivotally attached to each other and a side wall pivotally attached to one of each base portion. An attachment combines the base portions to truck bed and a tailgate attachment pivotally combines the tail gate to the base portions. I this manner, a removable truck bed extension is provided that can be collapsed and stored in the truck bed for selective use.

DETAIL DESCRIPTIONS OF THE INVENTION

All illustrations of the drawings are for the purpose of describing selected versions of the present invention and are not intended to limit the scope of the present invention.

Figure 20:
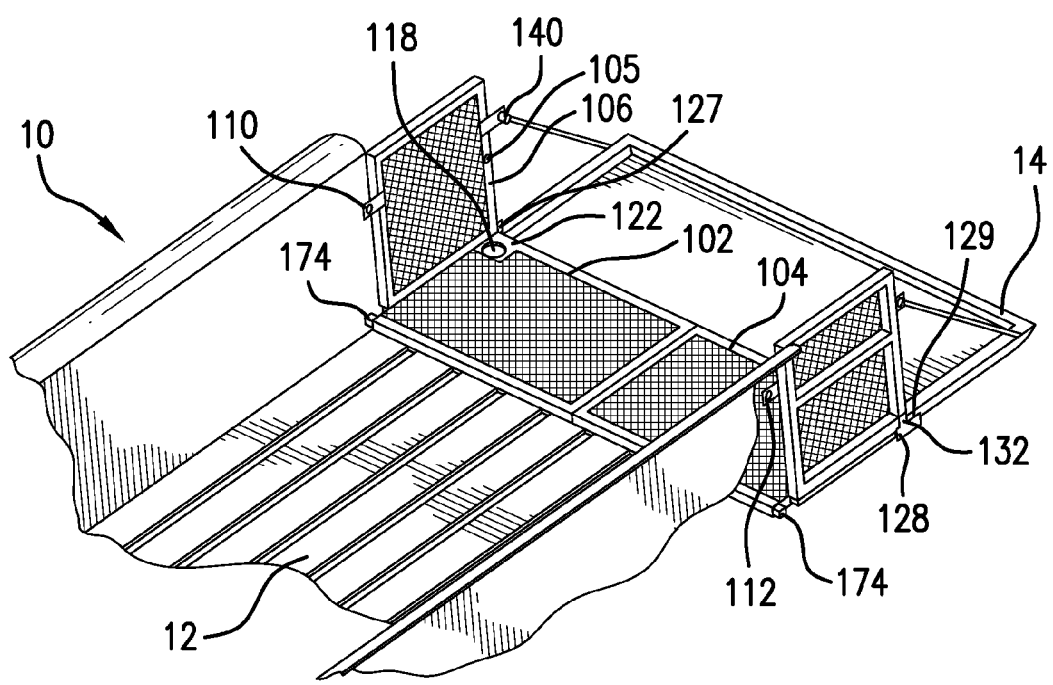
FIG. 20 is a perspective view of the present invention attached to a truck bed and a tail gate.

The present invention provides a tailgate extender 100 that gives a truck 10 (shown in FIG. 20) the ability to increase the length of its truck bed 12. The objective of the present invention is to extend the length of the truck bed 12 whenever it is necessary to do so, without making any alterations to the tailgate 14 or the truck bed 12.

The present invention is detachable; such that, it has the ability to be attached to a truck bed 12, providing the extension, and then to be detached, returning the truck bed 12 to its original embodiment. The present invention is collapsible; such that, it has the ability to fold upon itself, reducing the space its embodiment occupies. The detachable feature, along with the collapsible feature, provides an additional function, which is to simplify the storage of the present invention. Since the overall size of the present inventions embodiment can be reduced and it can be transported, then the present invention can be housed within a broad range of storage centers. It is assumed that a storage center is any location an object can be housed.

Tailgate extender 100 comprises a left base 102, a right base 104, a left wall 106, and a right wall 108. The left base 102 comprises a left lower bed attachment 114 and a left lower tailgate attachment 127. The left wall 106 comprises a left upper bed attachment 110 and a left upper tailgate attachment 140. The right base 104 comprises a right lower bed attachment 116 and a right lower tailgate attachment 129. The right wall 108 comprises a right upper bed attachment 112 and a right upper tailgate attachment 142.

Lower bed attachments 114 and 116 are adapted to connect to a tailgate pivot connection on the truck bed 12. The tailgate pivot connection on each side of the truck bed provides an axis of rotation for the tailgate. Tailgate extender 100 is positioned away from the truck bed and moved toward the tailgate pivot connection so that the tailgate pivot connection is positioned into lower bed attachments 114 and 116 through the slot provided therein.

Upper bed attachments 110 and 112 are adapted to connect to a latch device on the truck bed 12. The latch device includes a biased latch member arranged for coaction with upper bed attachments 110 and 112 so that the latch member engages the respective holes therein and secures tailgate extender 100 to the truck bed 12.

Upper tailgate attachments 140 and 142 are adapted to connect to a latch device on the tailgate 14. The latch device on each side of the tailgate 14 includes a latch member pivotally mounted within a housing and arranged for coaction with upper tailgate attachments 140 and 142.

Lower tailgate attachments 127 and 129 are adapted to combine with pivot pins secured to respective sidewalls near the lower ends to mount the tailgate 14 for pivotal movement between its raised and lowered positions.

Each left wall 106 and the right wall 108 has a tailgate strap attachment rod 105 that is adapted to receive the cables attached to the tailgate 14. This prevents the tailgate 14 from rotating past ninety-degrees when the tailgate 14 is released.

The left base 102 is rotatably connected to the right base 104. This allows the left base 102 to fold overtop the right base 104. The left wall 106 is rotatably connected to the left base 102. This allows the left wall 106 to fold overtop the left base 102. Also, the right wall 108 is rotatably connected to the right base 104. Similarly, this allows the right wall 108 to be folded overtop the right base 104. These rotatable connections provide the tailgate extender 100 with the ability to be collapsible.

A mechanism for holding the tailgate extender 100 in the collapsed position can also be provided. Such a mechanism could be magnets attached to corresponding walls 106 and 108 and bases 102 and 104 to selectively attach the same together in the collapsed position. Alternatively, a button and strap arrangement could be provided with a button combined to each one of the walls 106 and 108 and bases 102 and 104 with the corresponding strap combined to the other that way the corresponding wall and base pairs can be latched together in the collapsed position.

Figure 1:
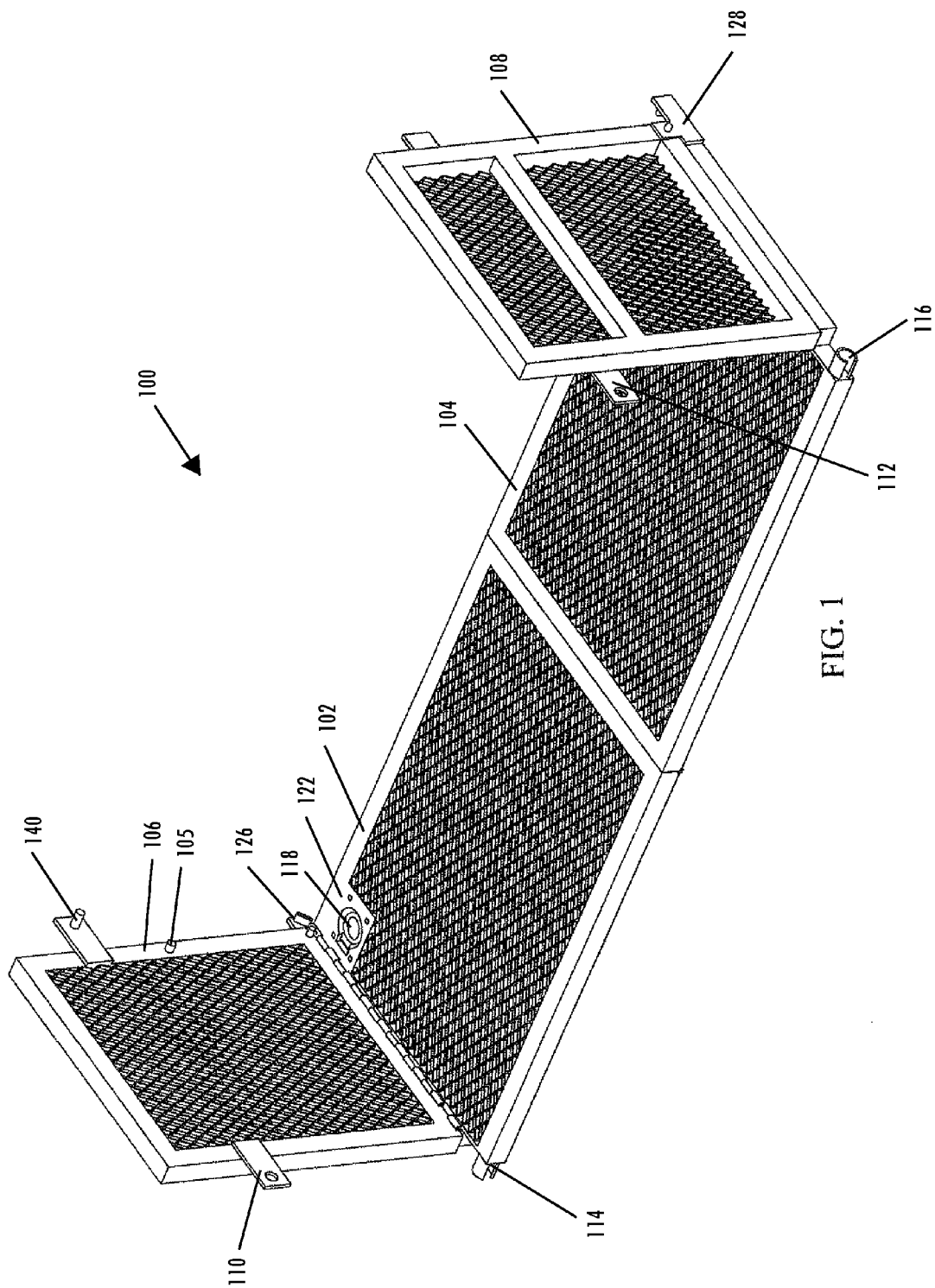
FIG. 1 is an isometric perspective view of the present invention, showing the present invention unfolded and in a readily attachable configuration.
Figure 2:
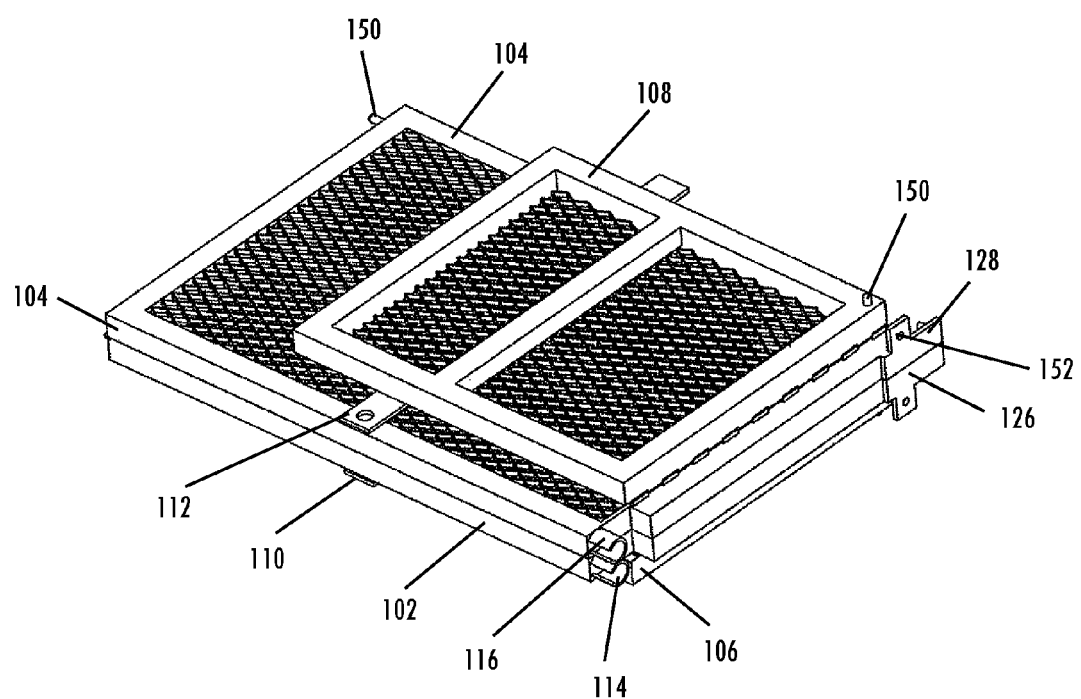
FIG. 2 is an isometric perspective view of the present invention, showing the present invention folded and in its fully collapsed configuration.

The space that tailgate extender 100 occupies when fully collapsed is significantly less than the space that it occupies when unfolded in its readily attachable configuration. An example of the tailgate extender 100 in its fully collapsed configuration is shown in FIG. 2. Also, FIG. 8-13 show the front, back, top, bottom, right, and left perspective views of the tailgate extender 100 in its fully collapsed configuration. The right wall 108 and the left wall 106 is symmetrical about the axis in which the left base 102 and the right base 104 are rotatably connected when the tailgate extender 100 is unfolded and in its readily attachable configuration. An example of this orientation of the left wall 106 and the right wall 108 is shown in FIG. 1. Also, FIG. 14-19 show the front, back, top, bottom, right, and left perspective views of the tailgate extender 100 in its unfolded and readily attachable configuration.

In order to maintain the rigidity of the left wall 106 and the right wall 108 when the tailgate extender 100 is unfolded and in its readily attachable configuration, each wall 106 and 108 includes a wall lock rod 132, 130 (respectively). Each left wall 106 and right wall 108 locks into the wall connection plate 126, 128 that is combined to each of the left base 102 and the right base 104. Each wall lock rod 130, 132 is spring loaded and traversed through the respective left wall 106 and right wall 108. An inner spring is connected to the wall lock rod 132 and is connected within the left wall 106. If the wall lock rod 132 is pressed against a stationary surface, the wall lock rod 132 traverses through the left wall 106 but does not fully exit the left wall 106. The inner spring compresses if a force presses the wall lock rod 132 through the left wall 106; concurrently, the wall lock rod 132 returns to its original position if such a force no longer presses against it. A wall lock rod 130 is connected to the right wall 108 in a similar manner. The wall connection plate 126, 128 is essentially a fiat plate with a rod hole 152 traversing through it. A wall connection plate 128 is perpendicularly connected the right base 104; while, a wall connection plate 126 is perpendicularly connected to the left base 102.

Figure 3:
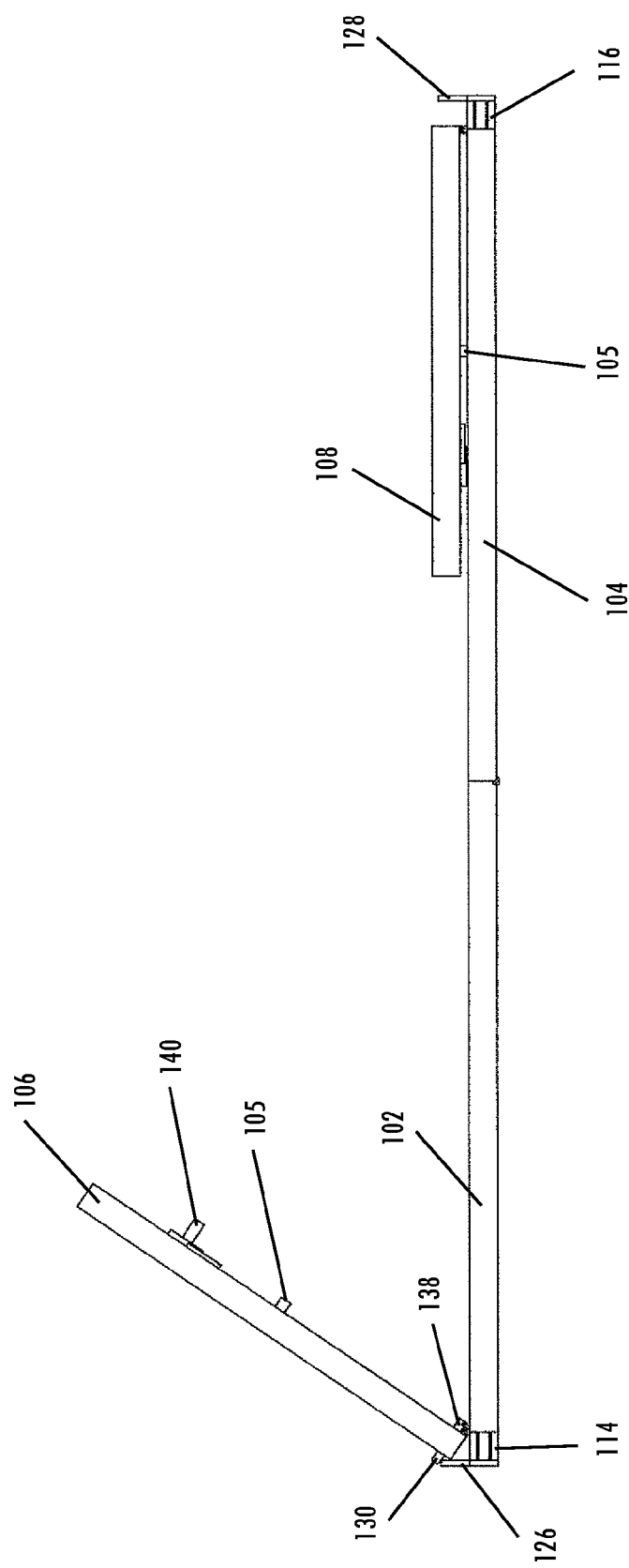
FIG. 3 is a front perspective view of the present invention, showing the wall lock rod and the wall connection plate with the present invention partially unfolded.

From the folded configuration, the left wall 106 is rotated about its rotatable connection with the left base 102. As the left wall 106 approaches its upright orientation, the edge of the wall lock rod 132 presses against the wall connection plate 126 of the left base 102; an example of this is shown in FIG. 3. The wall lock rod 132 compresses the inner spring which causes the wall lock rod 132 to be traversed through the left wall 106, allowing the left wall 106 to continue its rotation.

Figure 4:
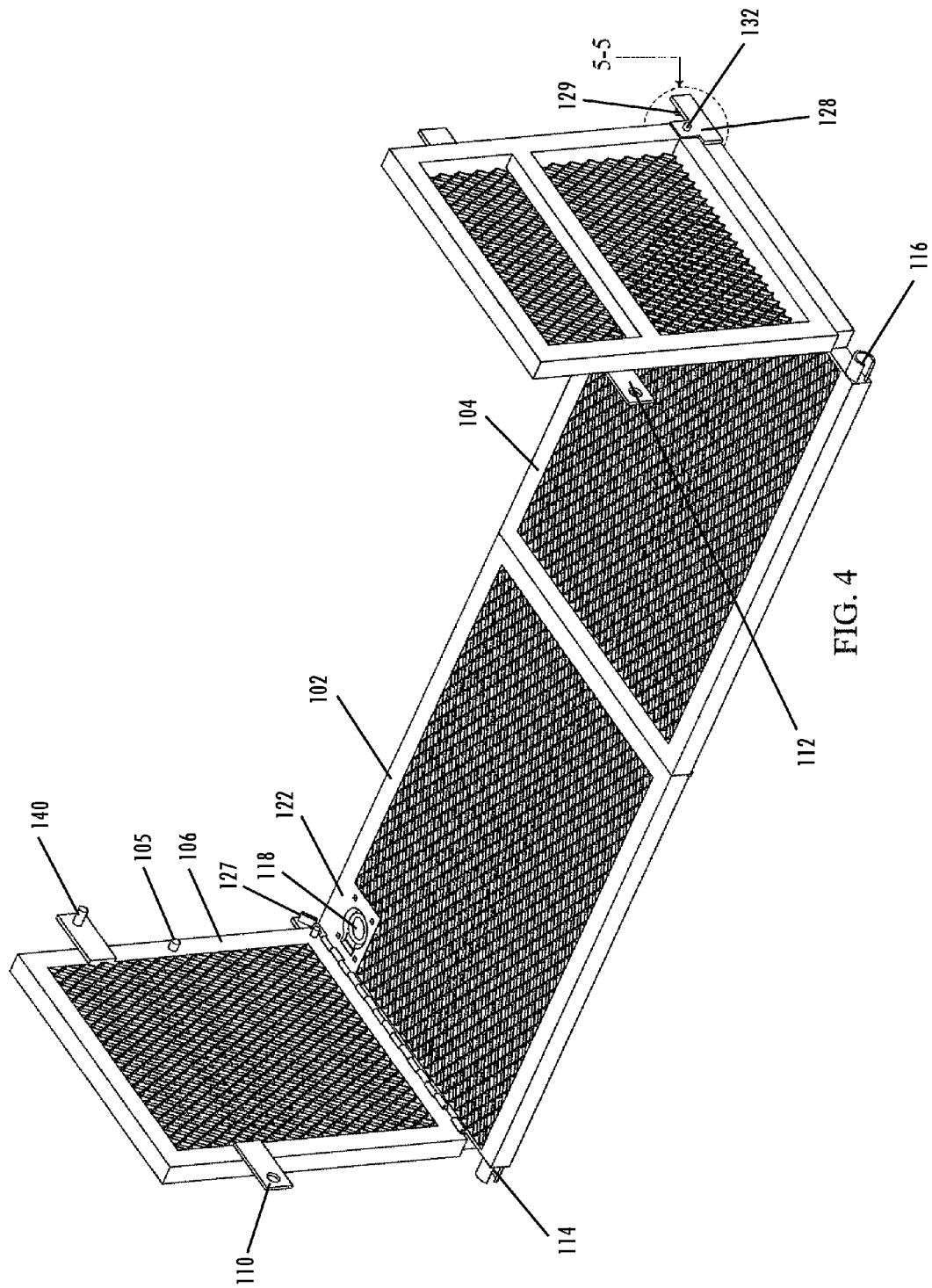
FIG. 4 is an isometric perspective view of the present invention, showing the detail section 5-5.
Figure 5:
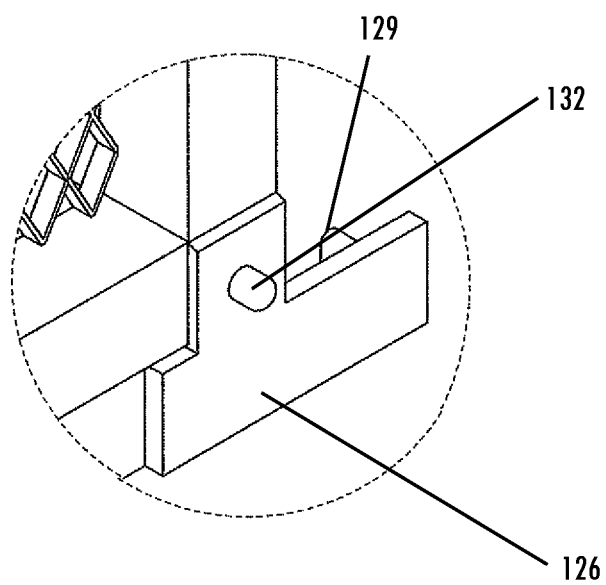
FIG. 5 is the detail view 5-5 of FIG. 4.

When the left wall 106 is at its upright position, perpendicular to the left base 102, the wall lock rod 132 meets the rod hole of the wall connection plate 126. Since there is no longer any obstruction to the wall lock rod 132, it traverses through the rod hole 152 and return to the original size of its embodiment; FIG. 5 is a detail view, 5-5, of the right side wall lock rod 130 traversing through the rod hole 152. FIG. 4 shows the location of the detail view, 5-5. The left wall 106 is locked into position when it reaches the upright position. The right wall 108 performs the same process during its rotation from the folded configuration to its upright position—all components are positioned similarly.

Figure 6:
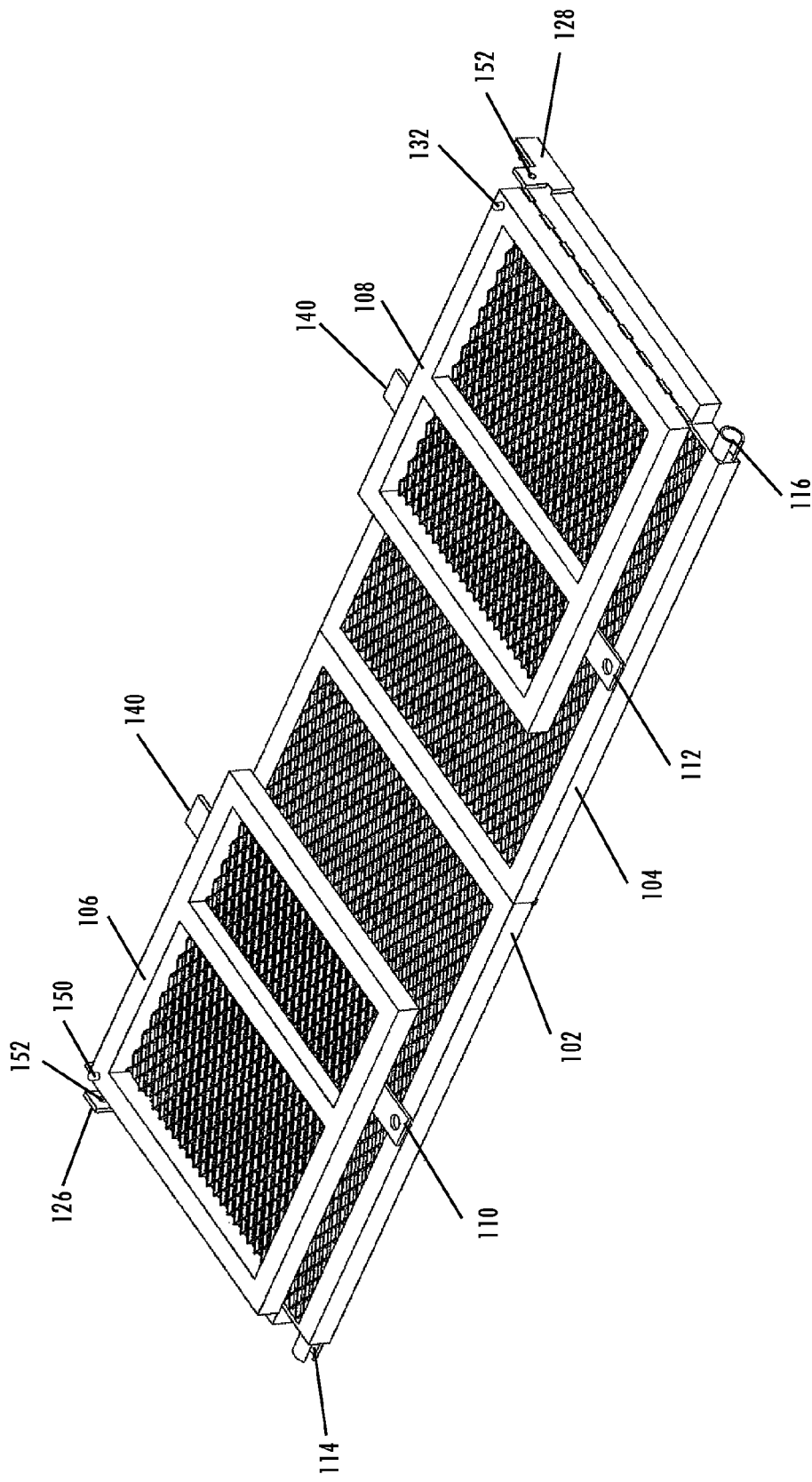
FIG. 6 is an isometric perspective view of the present invention, showing the left base fixed to the right base.

The left base 102 fixes to the right base 104 when unfolded similarly as the left wall 106 or the right wall 108 is fixed into the upright position. A similar right base connection lock rod 150 (shown in FIG. 15) locks into the connection rod cavity in left base 102 to hold the left base 102 and right base 104 in position. The right base connection lock rod 150 traverses through the right base 104 and an inner spring connects it within the right base 104. This provides the similar spring action that the aforementioned wall lock rods 130 and 132 provide. As the left or right base 102 and 104, respectively, is rotated from its folded configuration, the right base connection lock rod 150 approaches the left base 102. Upon meeting the left base 102, the right base connection lock rod 150 presses through the left base 102 until the right base connection lock rod 150 is positioned in the connection rod cavity. This fixes the left base 102 to the right base 104 so that the left base 102 is parallel to the right base 104. An example of this configuration is shown in FIG. 6. With the left base 102 fixed to the right base 104, the tailgate extender 100 can able to bear loads without deformation or hyperextension.

If it is desired to return the left wall 106 or the right wall 108 from its fixed upright position to a rotatable state, then the wall lock rod 130 132 is removed from the rod hole 152 to allow the left wall 106 or the right wall 108 to rotate. The wall lock rod 130, 132 can be removed with the use of a rod ring 138. The rod ring 138 is connected to each wall lock rods 130 and 132, opposite to the surface that will meet the respective wall connection plates 126 and 128, respectively. This rod ring 138 allows the wall lock rods 130 and 132 to exit the rod hole when a pull force is exerted onto the respective wall lock rods 130 and 132 from the corresponding rod rings 138. Removing the wall lock rods 130 and 132 from the respective rod holes 152 allows the left wall 106 or the right wall 108 to be rotated, depending upon which wall lock rod 130, 132 has been removed.

Attaching the tailgate extender 100 to a truck bed 12 requires the removal of the tailgate 14. With the tailgate 14 removed from the truck bed 12, there the left and the right tailgate rod as well as a left and a right tailgate pivot connection are exposed. Commonly, a tailgate 14 is rotatably attached to the tailgate pivot connections of the vehicle 10; it is the left and the right tailgate pivot connections that allow the tail gate 14 to be rotated. A wired latch, a rod latch or any similar functioning technology usually attaches to the left and right tailgate rods from the tailgate 14 to prevent the tail gate 14 from rotating more than 90 degrees.

The lower bed attachment 114 of the left base 102 attaches to the left tailgate pivot connection; and, the lower bed attachment 116 of the right base 104 attaches to the right tailgate pivot connection. With the left wall 106 in its upright fixed position, its upper bed attachment 110 attaches to the left tailgate latch device on the truck bed 12. For the right wall 108, when it is in its upright fixed position, it attaches to the right tailgate latch device on the truck bed 12. Having the left base 102 and the right base 104 attached to the truck bed 12, along with the left wall 106 and the right wall 108 attached to the truck bed 12, the tailgate extender 100 functions as an extension. Objects that were too long to be housed within the truck bed 12 could be housed with the tailgate extender 100 attached to the vehicle 10.

The detached tailgate 14 from a vehicle 10 can be reattached to the tailgate extender 100. This is performed by the upper tailgate attachments 140 and 142, the lower tailgate attachments 127 and 129, and the tailgate strap attachments 105. It is assumed the tailgate 14 has a left pivot and a right pivot in which it rotates about when attached to the lower tailgate attachments 127 and 129. The left pivot of the tailgate 14 rotatably attaches to the left lower tailgate attachment 127; similarly, the right pivot of the tailgate 14 rotatably attaches to the right lower tailgate attachment 129. This allows the tailgate 14 to rotate about the left and right pivots. The left cable of the tailgate 14 can attach to the tailgate strap attachment rod 105 of the left wall 106 and the right cable can attach to the tailgate strap attachment rod on the right wall 108. This prevents the tailgate 14 from rotating more than 90 degrees as would be done if it were attached to the vehicle 10 instead of the tailgate extender 100. The tailgate 14 can lock onto the tailgate extender 100 in the closed position when the latch device on the tailgate 14 combines with the upper tail gate attachments 140 and 142. Therefore, the tailgate 14 will function property and indifferently to its original configuration when attached to tailgate extender 100.

Figure 7:
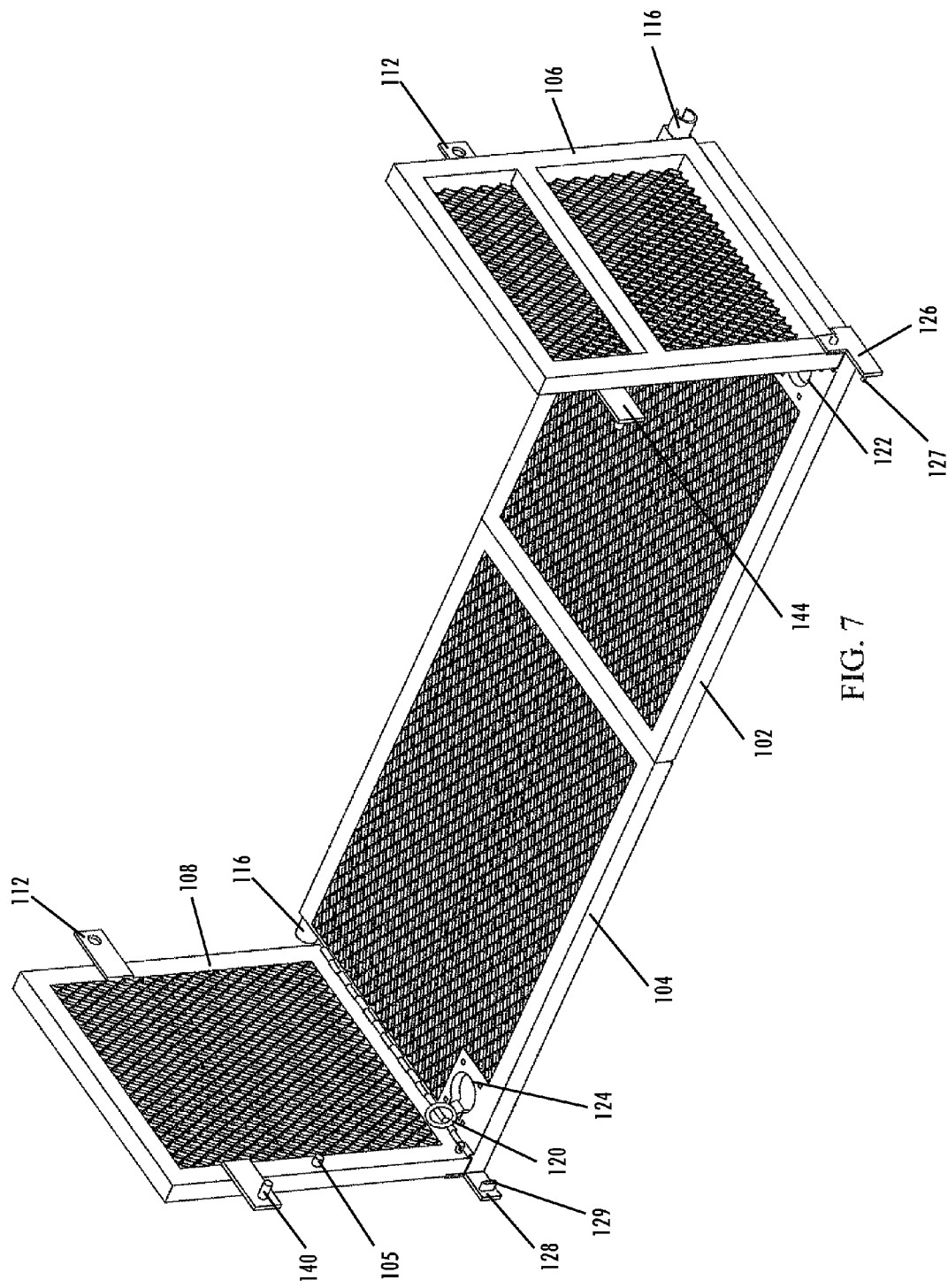
FIG. 7 is a rear isometric perspective view of the present invention, showing the rotatable attachment loop in its upright position.
Figure 8:
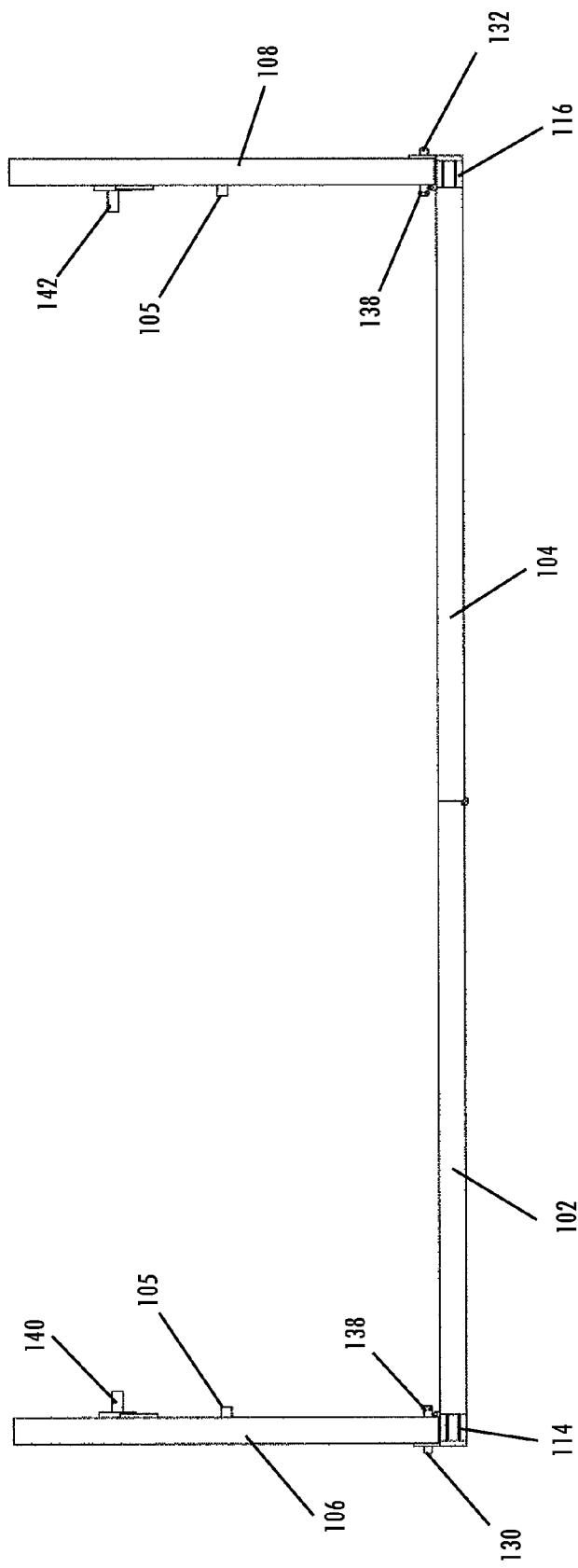
FIG. 8 is a front perspective view of the present invention, showing the present invention unfolded and in a readily attachable configuration.
Figure 9:
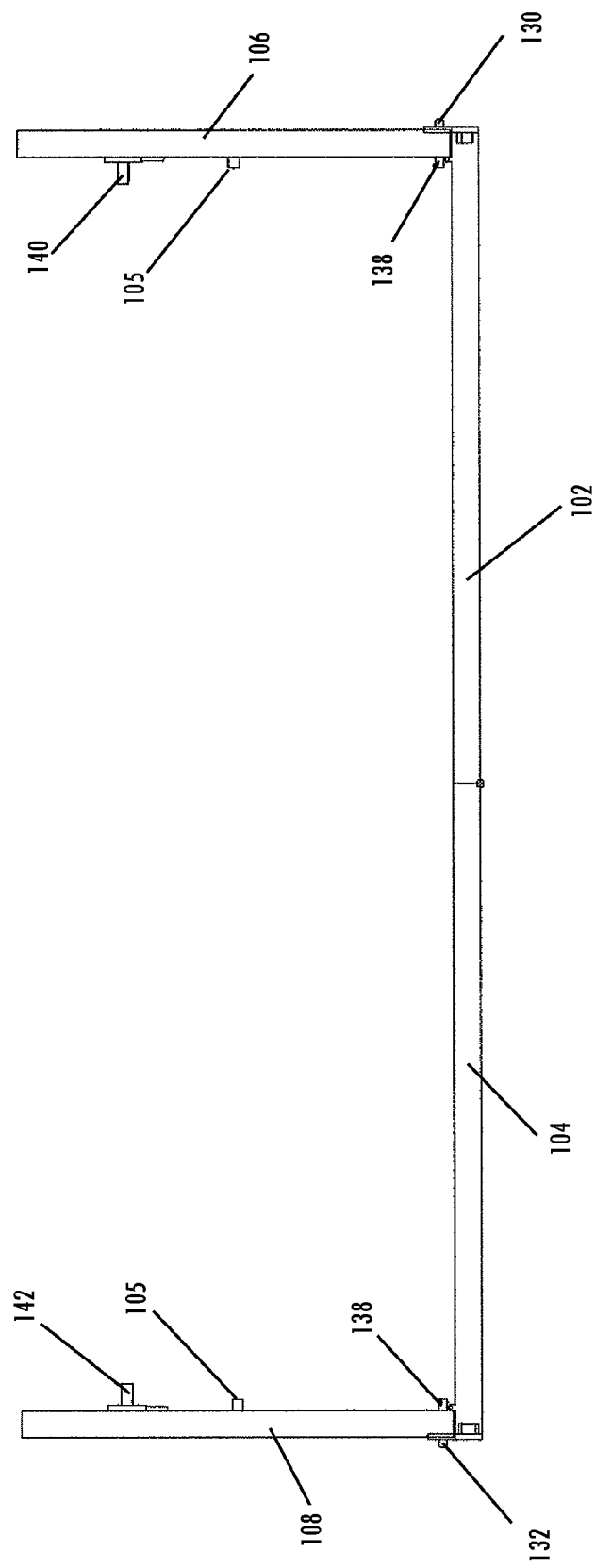
FIG. 9 is a back perspective view of the present invention, showing the present invention unfolded and in a readily attachable configuration.
Figure 10:
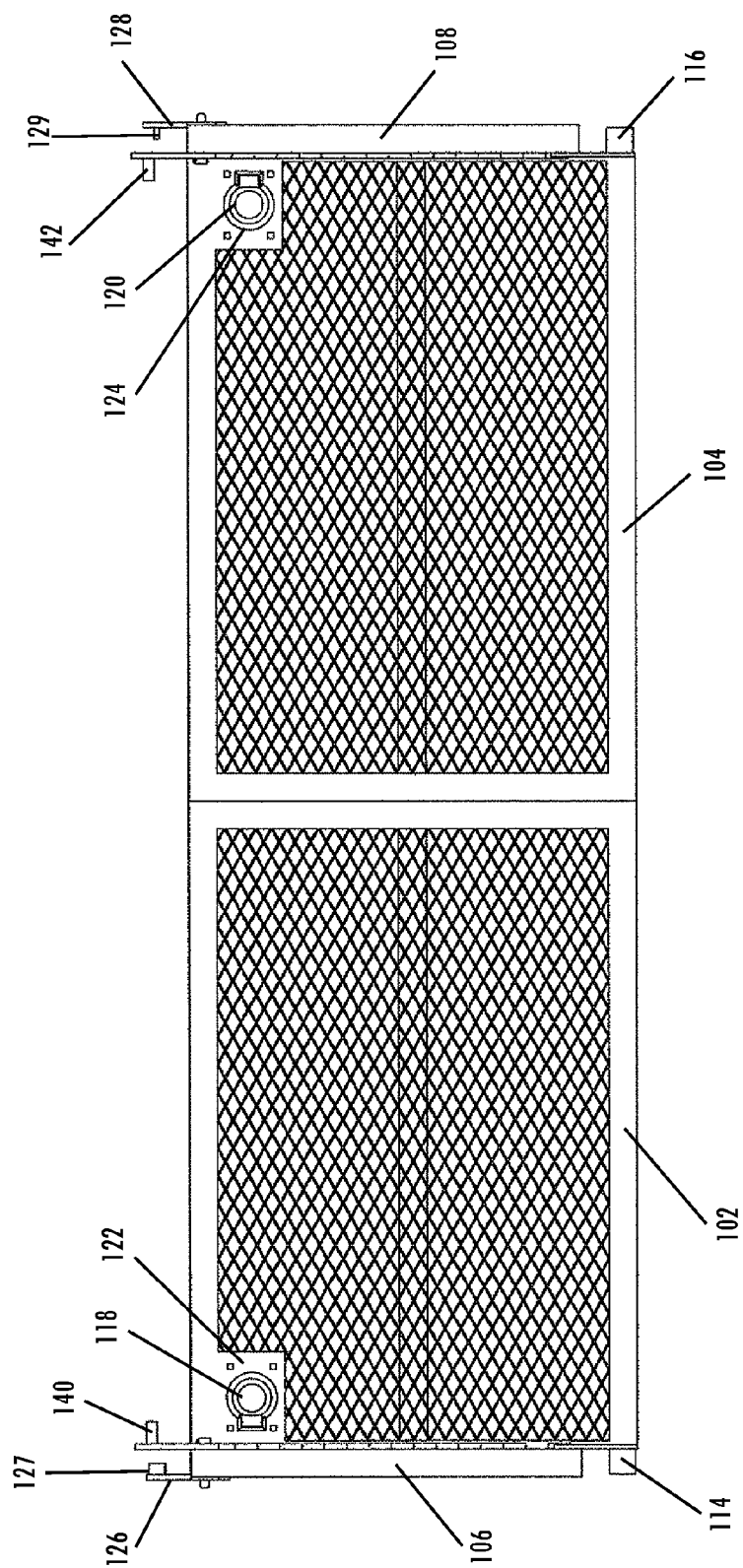
FIG. 10 is a top perspective view of the present invention, showing the present invention unfolded and in a readily attachable configuration.
Figure 11:
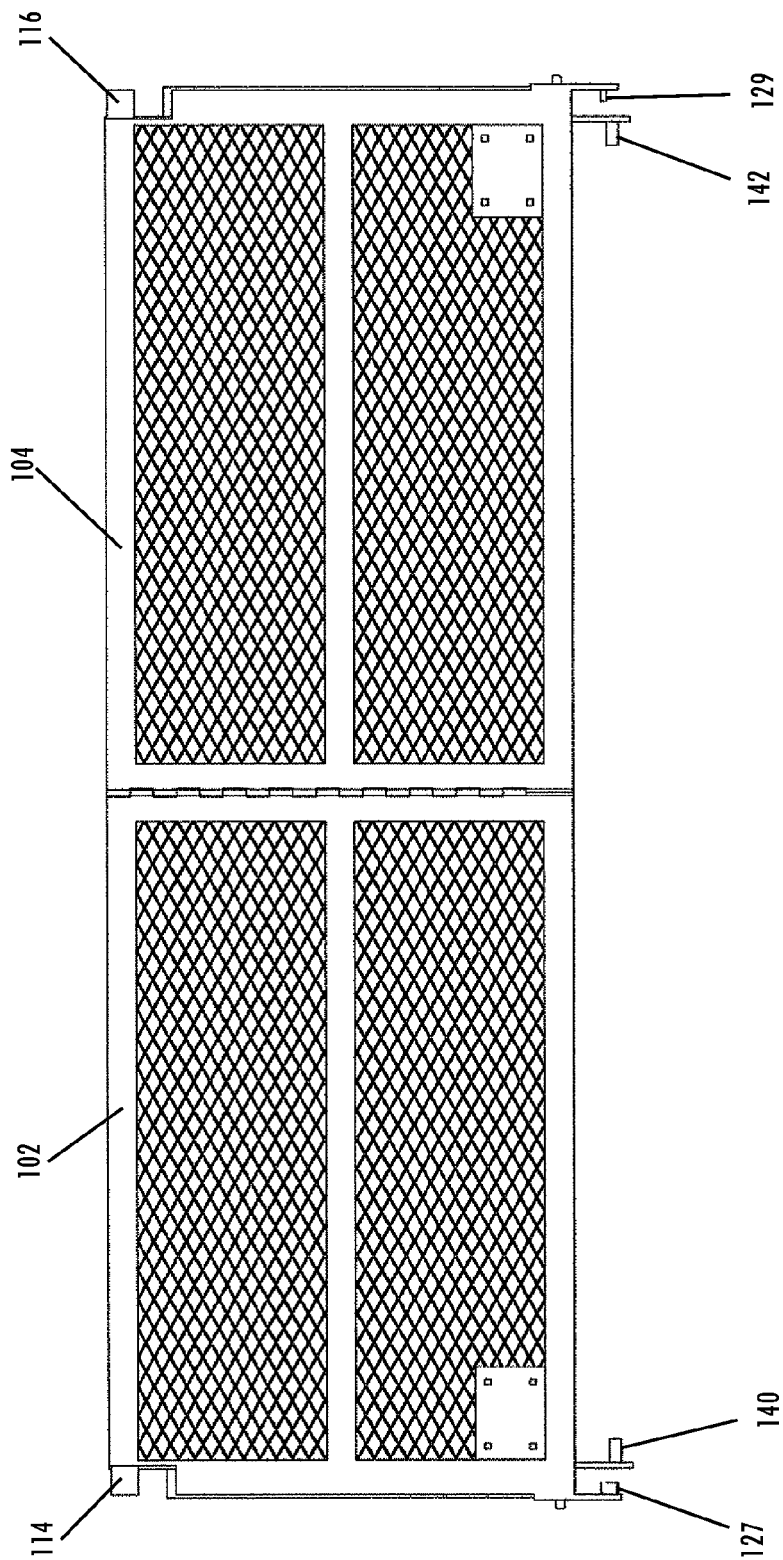
FIG. 11 is a bottom perspective view of the present invention, showing the present invention unfolded and in a readily attachable configuration.
Figure 12:
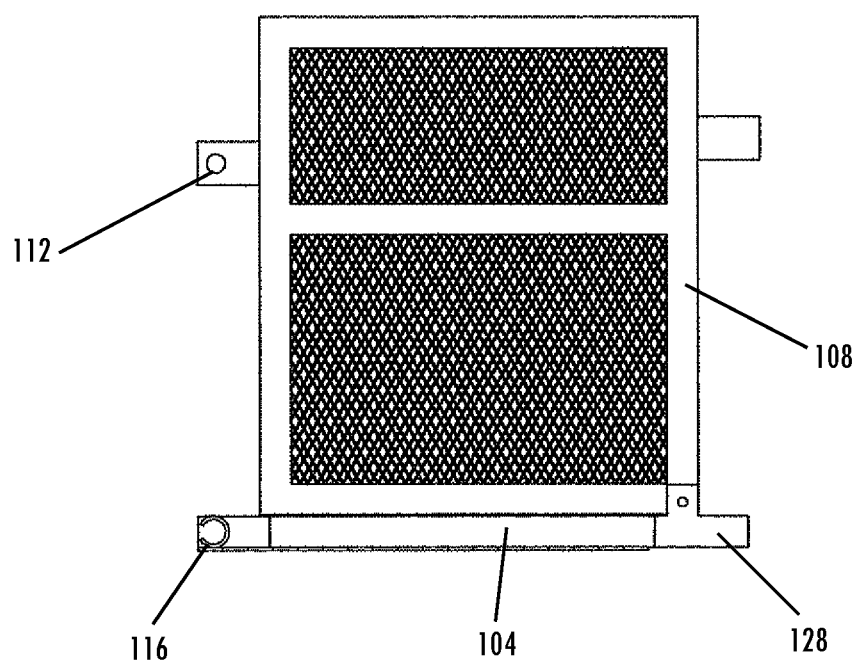
FIG. 12 is a right perspective view of the present invention, showing the present invention unfolded and in a readily attachable configuration.
Figure 13:
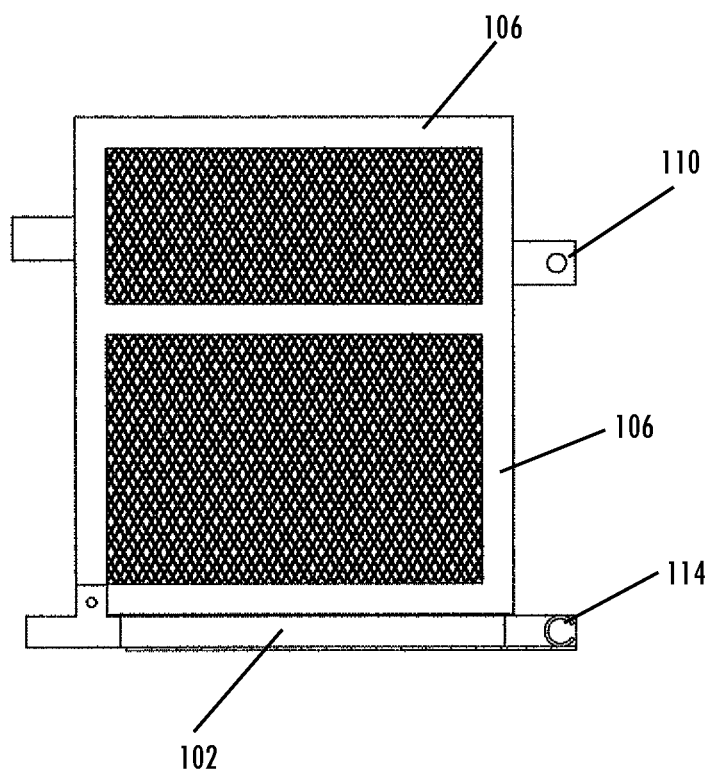
FIG. 13 is a left perspective view of the present invention, showing the present invention unfolded and in a readily attachable configuration.
Figure 14:
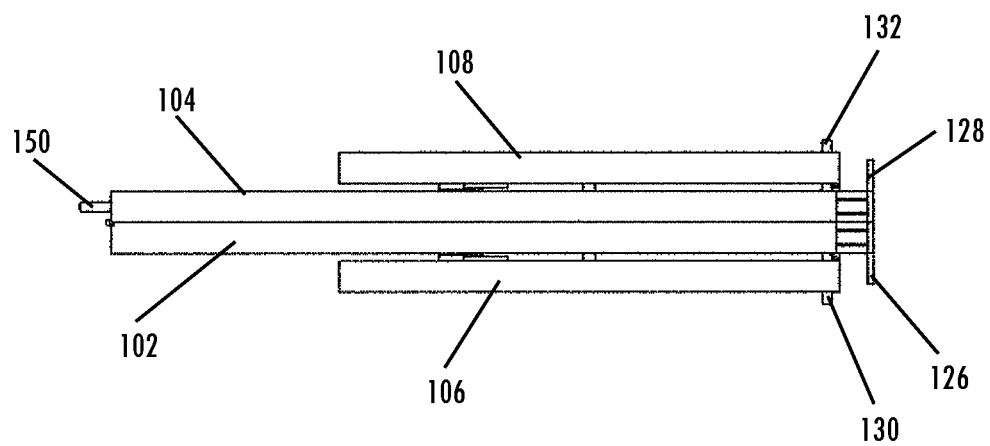
FIG. 14 is a front perspective view of the present invention, showing the present invention folded and in its fully collapsed configuration.
Figure 15:
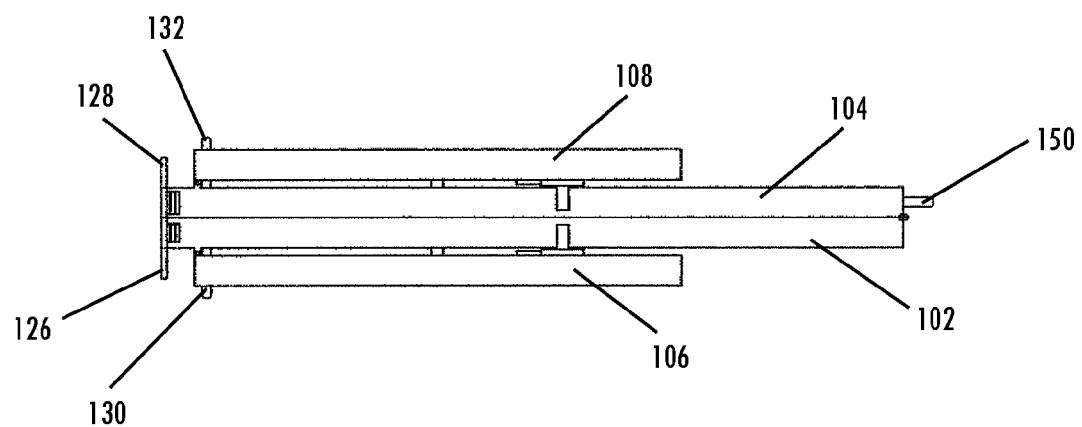
FIG. 15 is a back perspective view of the present invention, showing the present invention folded and in its fully collapsed configuration.
Figure 16:
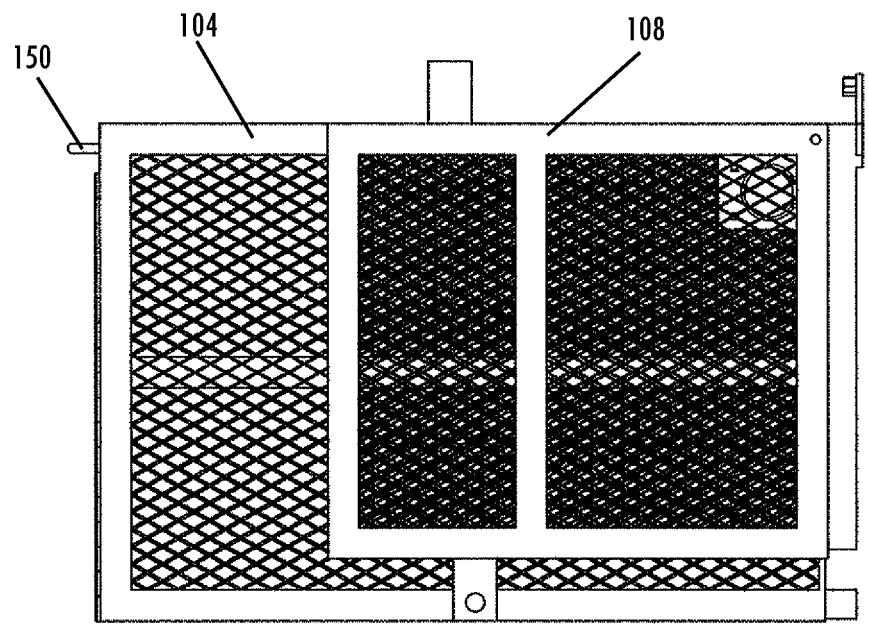
FIG. 16 is a top perspective view of the present invention, showing the present invention folded and in its fully collapsed configuration.
Figure 17:
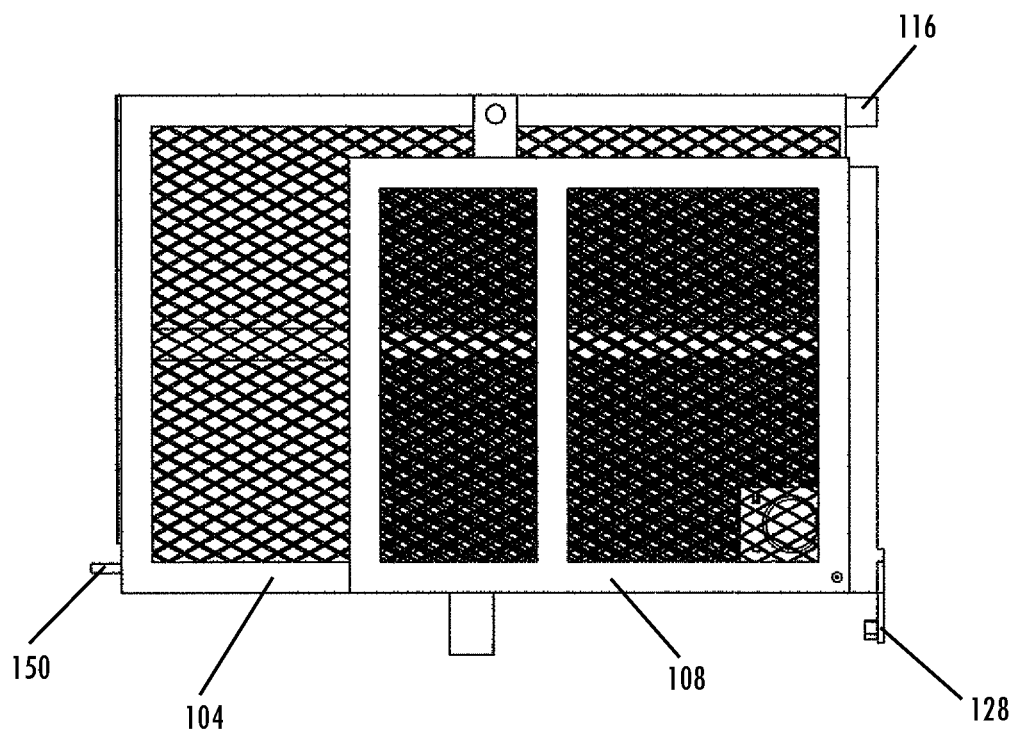
FIG. 17 is a bottom perspective view of the present invention, showing the present invention folded and in its fully collapsed configuration.
Figure 18:
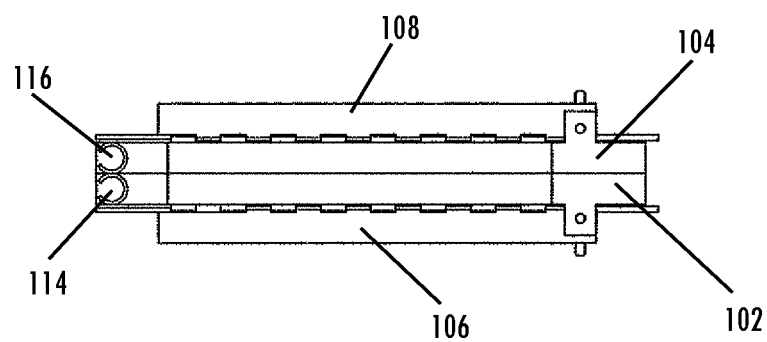
FIG. 18 is a right perspective view of the present invention, showing the present invention folded and in its fully collapsed configuration.
Figure 19:
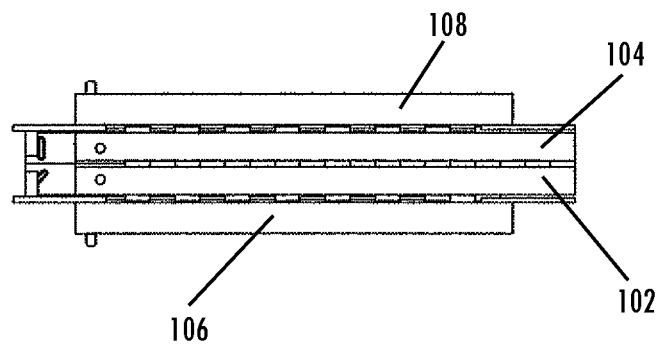
FIG. 19 is a left perspective view of the present invention, showing the present invention folded and in its fully collapsed configuration.

Most truck beds 12 have attachment loops that allow ropes-like devices to be threaded through or to allow a hook to attach to, so that objects can be secured to the truck bed 12. The left base 102 and the right base 104 have similar technology, which are rotatable attachment loops 118, 120. These rotatable attachment loops 118, 120 rest within attachment loop housing 122, 124 when not in use. To use the rotatable attachment loops 118, 120, each can to be rotated so that their embodiment partially exists the attachment loop housing 122, 124. This allows the aforementioned rope-like devices or hooks to be threaded through or attached to the rotatable attachment loop 118, 120. An example of the rotatable attachment loops 118, 120 in their upright position is shown in FIG. 7.

Although the tailgate extender 100 has been explained in relation to its preferred embodiment, it is to be understood that many other possible modifications and variations can be made without departing from the spirit and scope of the invention as herein described. For example, tailgate extender 100 is configurable for attachment with any style of truck bed 12. Since truck beds 12 come in various sizes, left wall 106 and right wall 108 can be modified to extend and retract upward with respect to bases 102 and 104 to accommodate truck beds 12 with various depths. In this embodiment the vertical bars that form each of the walls 106 and 108 can telescope to change their heights.

Furthermore, the attachment mechanisms that combine tailgate extender 100 to the truck bed 12 and combine the tailgate 14 to tailgate extender 100 can be modified to combine with any make and model truck 10. With this in mind, the illustrated embodiment and the description herein is merely one example. The shape, position, and orientation of each of the attachment mechanisms may be modified without departing from the spirit and scope of the invention.

What is claimed is:

1. A truck bed extension for extending a bed of a truck, the truck bed extension comprising:
   a left base;
   a right base pivotally attached to the left base;
   a left side wall pivotally attached to the left base;
   a right side wall pivotally attached to the right base;
   a truck attachment that combines the left base and the right base to the bed of the truck to extend the bed of the truck; and
   a tailgate attachment that pivotally combines a tailgate of the truck to the left base and the right base.

2. The truck bed extension of claim 1, and further comprising a second truck attachment that combines the truck bed extension to the truck.

3. The truck bed extension of claim 1, wherein the left base and the right base pivot with respect to each other between a parallel position and superposed position with one of the left base and the right base on top of the other.

4. The truck bed extension of claim 1, wherein the right side wall pivots with respect to the right base between a perpendicular position and a superposed position with one of the right side wall and the right base on top of the other.

5. The truck bed extension of claim 1, wherein the left side wall pivots with respect to the left base between a perpendicular position and a superposed position with one of the left side wall and the left base on top of the other.

6. The truck bed extension of claim 1, wherein the right side wall pivots with respect to the right base between a perpendicular position and a superposed position with one of the right side wall and the right base on top of the other, and the left side wall pivots with respect to the left base between a perpendicular position and a superposed position with one of the left side wall and the left base on top of the other.

7. The truck bed extension of claim 6, wherein the left base and the right base pivot with respect to each other between a parallel position and superposed position with one of the left base and the right base on top of the other.

8. The truck bed extension of claim 1, and further comprising a biased connection rod combined with each of the left side wall and the right side wall, and a plate having a rod hole combined with each of the left base and the right base, wherein the connection rod engages the rod hole in the plate to support each of the side walls in a position perpendicular with respect to the right base and the left base.

9. The truck bed extension of claim 1, and further comprising a biased connection rod combined with one of the left base and the right base and a rod hole in the other one of the left base and the right base, wherein the connection rod engages the rod hole to support the right base and the left base in a position parallel to each other.

10. A truck bed extension for extending a bed of a truck, the truck bed extension comprising:
   a left base;
   a right base pivotally attached to the left base, wherein the left base and the right base pivot with respect to each other between a parallel position and superposed position with one of the left base and the right base on top of the other;
   a left side wall pivotally attached to the left base;
   a right side wall pivotally attached to the right base;
   wherein the right side wall pivots with respect to the right base between a perpendicular position and a superposed position with one of the right side wall and the right base on top of the other, and the left side wall pivots with respect to the left base between a perpendicular position and a superposed position with one of the left side wall and the left base on top of the other;
   a truck attachment that combines the left base and the right base to the bed of the truck to extend the bed of the truck; and
   a tailgate attachment that pivotally combines a tailgate of the truck to the left base and the right base.

11. The truck bed extension of claim 1, and further comprising a second truck attachment combined to one of the left side wall and the right side wall that combines the truck bed extension to the truck.

12. The truck bed extension of claim 10, and further comprising a biased connection rod combined with each of the left side wall and the right side wall, and a plate having a rod hole combined with each of the left base and the right base, wherein the connection rod engages the rod hole in the plate to support each of the side walls in a position perpendicular with respect to the right base and the left base.

13. The truck bed extension of claim 10, and further comprising a biased connection rod combined with one of the left base and the right base and a rod hole in the other one of the left base and the right base, wherein the connection rod engages the rod hole to support the right base and the left base in a position parallel to each other.

14. The truck bed extension of claim 10, and further comprising the truck.

15. A truck bed extension for extending a bed of a truck, the truck bed extension comprising:
   a left base;
   a right base attached to the left base;
   a left side wall attached to the left base;
   a right side wall attached to the right base;
   a truck attachment that combines the left base and the right base to the bed of the truck to extend the bed of the truck;
   a tailgate attachment that pivotally combines a tailgate of the truck to the left base and the right base; wherein the right base is pivotally attached to the left base and the right side wall is pivotally attached to the right base and the left side wall is pivotally attached to the left base, wherein the left base and the right base pivot with respect to each other between a parallel position and superposed position with one of the left base and the right base on top of the other and wherein the right side wall pivots with respect to the right base between a perpendicular position and a superposed position with one of the right side wall and the right base on top of the other and wherein the left side wall pivots with respect to the left base between a perpendicular position and a superposed position with one of the left side wall and the left base on top of the other.

16. The truck bed extension of claim 15, and further comprising a tailgate strap attachment rod on each one of the right side wall and the left side wall that combines the tail gate to the respective right side wall and the left side wall.

17. The truck bed extension of claim 15, and further comprising a biased connection rod combined with each of the left side wall and the right side wall, and a plate having a rod hole combined with each of the left base and the right base, wherein the connection rod engages the rod hole in the plate to support each of the side walls in a position perpendicular with respect to the right base and the left base.

18. The truck bed extension of claim 15, and further comprising a biased connection rod combined with one of the left base and the right base and a rod hole in the other one of the left base and the right base, wherein the connection rod engages the rod hole to support the right base and the left base in a position parallel to each other.

19. The truck bed extension of claim 15, and wherein the left side wall and the right side wall telescope in their perpendicular position to change a height.

\* \* \* \* \*